United States Patent

[11] 3,529,530

| [72] | Inventor | Toshio Tsuzuki<br>Somerville, New Jersey |
|---|---|---|
| [21] | Appl. No. | 782,953 |
| [22] | Filed | Dec. 11, 1968<br>Continuation-in-part of Ser. No.<br>654,405, July 19, 1967, abandoned,<br>which is a continuation-in-part of<br>Ser. No. 566,587, July 20, 1966,<br>abandoned |
| [45] | Patented | Sept. 22, 1970 |
| [73] | Assignee | By mesne assignments, to<br>Devro, Inc.<br>Somerville, New Jersey<br>a corporation of New Jersey |

[54] EDIBLE WATER SOLUBLE COLLAGEN FILM
13 Claims, 3 Drawing Figs.

[52] U.S. Cl. .................................................. 99/18,
99/171, 195/6, 260/117, 264/202
[51] Int. Cl. ............................................... A23j 1/10,
C09h 1/04
[50] Field of Search............................................. 99/171,
174, 175, 176; 195/6; 264/202; 260/117;
161/(Enquired); 252/(Enquired); 99/18

[56] References Cited
UNITED STATES PATENTS

| 3,034,852 | 5/1962 | Nishihara .................... | 264/202 |
|---|---|---|---|
| 3,071,477 | 1/1963 | Kievews ..................... | 99/176 |
| 3,131,130 | 4/1964 | Oneson ....................... | 195/6 |
| 3,235,641 | 2/1966 | McKnight.................... | 99/176UX |
| 3,373,046 | 3/1968 | Fagan.......................... | 99/175 |
| 3,427,169 | 2/1969 | Rose............................ | 99/176 |
| 3,314,861 | 4/1967 | Fujii............................. | 195/6 |

*Primary Examiner*—Frank W. Lutter
*Assistant Examiner*—Robert Halper
*Attorneys*—Alexander T. Kardos, Robert W. Kell and Leonard P. Prusak

ABSTRACT: An edible water soluble film characterized by instantaneous distintegration in boiling water is prepared by forming and drying a sheet of acid-swollen collagen treated with a proteolytic enzyme.

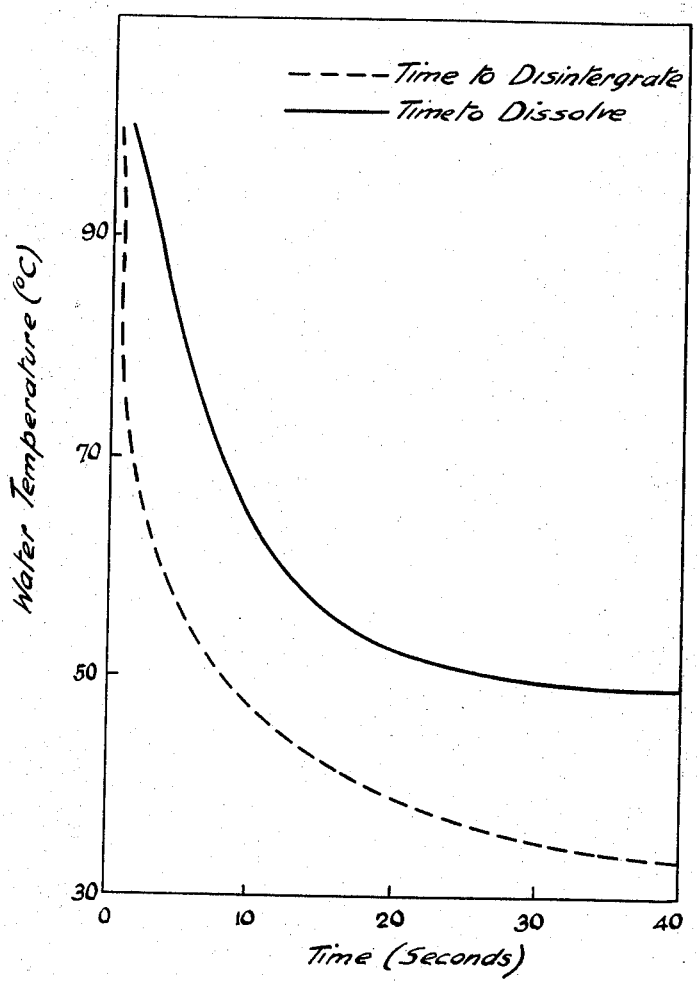

EDIBLE WATER SOLUBLE COLLAGEN FILM

The present invention is a continuation-in-part of application Ser. No. 654,405, filed July 19, 1967, now abandoned which application is a continuation-in-part of application Ser. No. 566,587, filed July 20, 1966; now abandoned and relates to an edible water soluble (water dispersible) film of collagen that has been treated with an enzyme.

Although a great deal has been published concerning the manufacture of water soluble edible films that would possess utility in the packaging of food, such products have not been utilized to any appreciable extent commercially because of their inherent weakness, *i.e.*, low tensile strength, low resistance to tearing, sensitivity to conditions of high humidity, and also because of their poor heat sealing properties.

It is well known that collagen, contained in the corium layer of fresh skins, may be cast to form films sufficiently strong to be used in the packaging of foods. Such collagen films, however, although edible are not readily soluble in water.

It has now been discovered that collagen may be modified by treatment with a proteolytic enzyme, such as ficin, within an acid pH range to obtain rapid dispersibility in water at 70°C. and higher temperatures while retaining a substantial amount of the original tensile strength of native collagen. Films manufactured from such enzyme-treated collagen are suitable for packaging foods being much stronger than films previously prepared from other edible compositions.

It is an advantage of the collagen films of the present invention that they have excellent gas permeability characteristics, which will permit the use of such films in situations where an oxygen barrier is important. Such collagen films are also resistant to greases, and oils, and when plasticized in the manner described below, become flexible at temperatures as low as −30°F. Such plasticized films can be readily heat sealed in the range of 200—250°F.

The enzyme-modified collagen of the present invention may be conveniently obtained from the corium layer of hides. Proteolytic enzymes, which may be used to modify the collagen in accordance with the present invention, are bromelain, ficin, and papain. The amount of enzyme employed is dependent upon the specific enzyme used, and the pH and temperature of the collagen dispersion. These factors are adjusted to produce satisfactory results with the particular enzyme used as will be indicated in the patent examples that follow.

When the proteolytic enzyme is ficin, between 0.05 and 0.50 parts by weight are used to treat 100 parts by weight of collagen. The treatment of collagen with an enzyme solution in accordance with the conditions to be described alters the molecular weight of the collagen; a process that may be followed by determining the tyrosine released during the reaction. The weight ratio of free tyrosine to hydroxyproline (collagen) in the reaction mixture should be no less than 0.062 when fresh hide is treated with a proteolytic enzyme. It is essential that the conditions of enzyme treatment be such that films prepared from the enzyme treated collagen will quickly disintegrate in hot water. At the same time, great caution must be exercised to prevent such modification of the collagen as would diminish its tensile strength to the extent that it would not be suitable as a food packaging material.

Films of the enzyme-modified collagen may be prepared by grinding an aqueous slurry of collagen together with an enzyme and acidifying the mixture with an edible, non-toxic acid, such as, citric acid. The acid-swollen collagen is stored for several hours at room temperature, then homogenized and de-aerated before a film is formed from it.

Plasticizers, such as glycerin, sorbitol, mannitol, sucrose, propylene glycol, or corn syrup, may be added to the modified collagen in amounts of from about 20 percent to about 50 percent of the collagen solids. In preparing a cast collagen film, blocking may occur if the plasticizer amounts to more than about 50 percent by weight. Collagen films which contain less than about 20 percent by weight of plasticizer are somewhat brittle and will not heat seal reliably on commercial heat sealing equipment. Preferably, the plasticizer in the collagen film will amount to about 30 percent of the collagen solids (dry).

While as indicated above, both glycerin and propylene glycol may be used in plasticizing collagen films, glycerin is a preferred plasticizer. It has been noted that the use of mannitol as a plasticizer improves the heat sealing characteristics of the product and broadens the temperature range within which a satisfactory heat seal may be obtained. A particularly preferred film from the standpoint of heat sealability is one that contains 10 percent sorbitol, 10 percent glycerin, or propylene glycol and 10 percent mannitol based on collagen solids.

In addition to the plasticizer, other film ingredients, such as starch, vegetable gum, vegetable cooking oil, edible cellulose derivatives, gelatin, flavoring agents, coloring agents, anti-oxidants, emulsifiers, etc. may be added to the enzyme-modified collagen. The use of starch material offers the advantage of economy and permits one to increase the solids' content of the collagen mass. Three different types of starches have been found suitable for the modified collagen film formulations of the present invention. These are thin-boiling (acid-hydrolyzed, low viscosity) amylopectin starch from the waxy variety of cereals, such as, waxy corn, waxy rice, waxy sorghum, etc.; thin boiling ordinary starch (20—25 percent amylose and 75—80 percent amylopectin) from corn, rice, sorghum, wheat, potato, sweet potato, tapioca, etc.; and high-amylose starch of the fractionated variety or derived from high-amylose hybrid corn. Desirably, a suitable starch material for use with the enzyme-modified collagen of the present invention will form a paste which does not form a rigid gel upon cooling to room temperature and the starch material is capable of forming a film. It is also desirable that the starch material be sufficiently soluble in water to enable one to make a starch solution having a relatively high solids' content. The known tendency of both thin-boiling ordinary starch and high amylose starch to form a rigid gel when a cooked starch paste is cooled can be reduced by modifying the starches chemically, *e.g.*, by esterification or etherification. A preferred starch for use with the modified collagen of the present invention is a thin-boiling amylopectin starch which may be added to the film-forming compositions of the present invention in amounts equal to the modified collagen. The preferred amount of amylopectin starch is approximately 30 percent based upon the dry weight of the enzyme-modified collagen.

The invention will appear more clearly from the following detailed description when taken in connection with the accompanying drawings, showing by way of example, a preferred embodiment of the inventive idea.

Referring now to the drawings:

FIG. 3, is a graph that illustrates the rate at which collagen film prepared in accordance with the present invention will dissolve in hot water.

Figure 1:
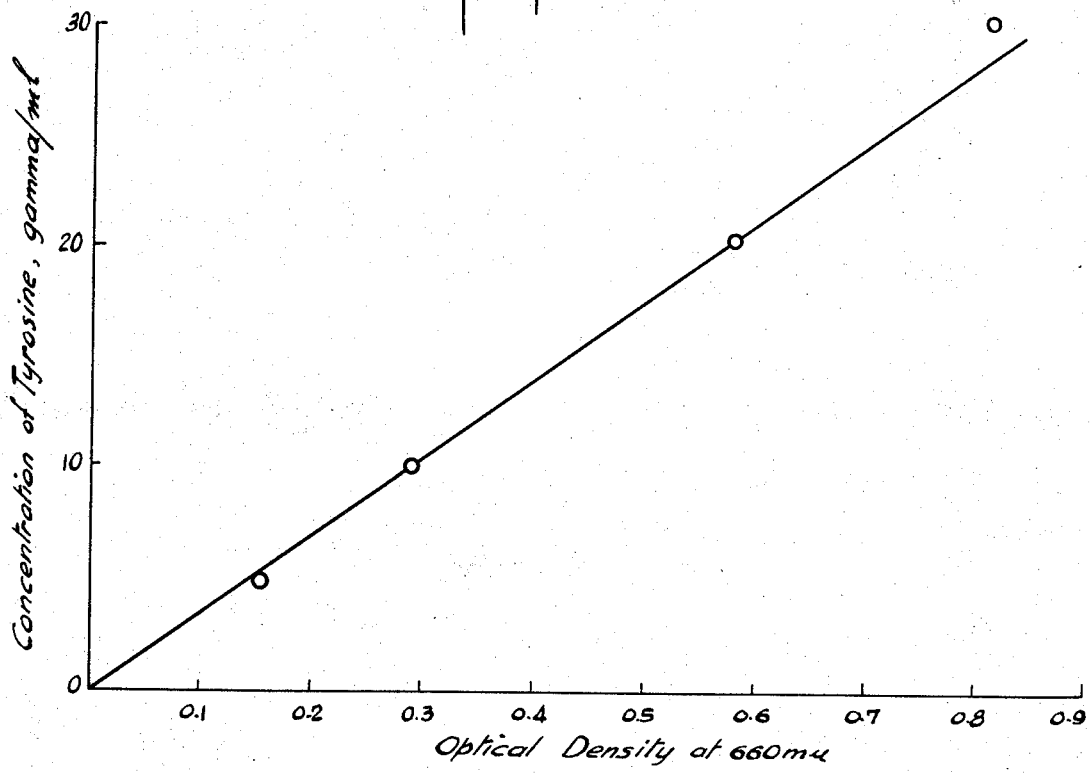
FIG. 1 is a graph relating optical density to tyrosine concentration.
Figure 2:
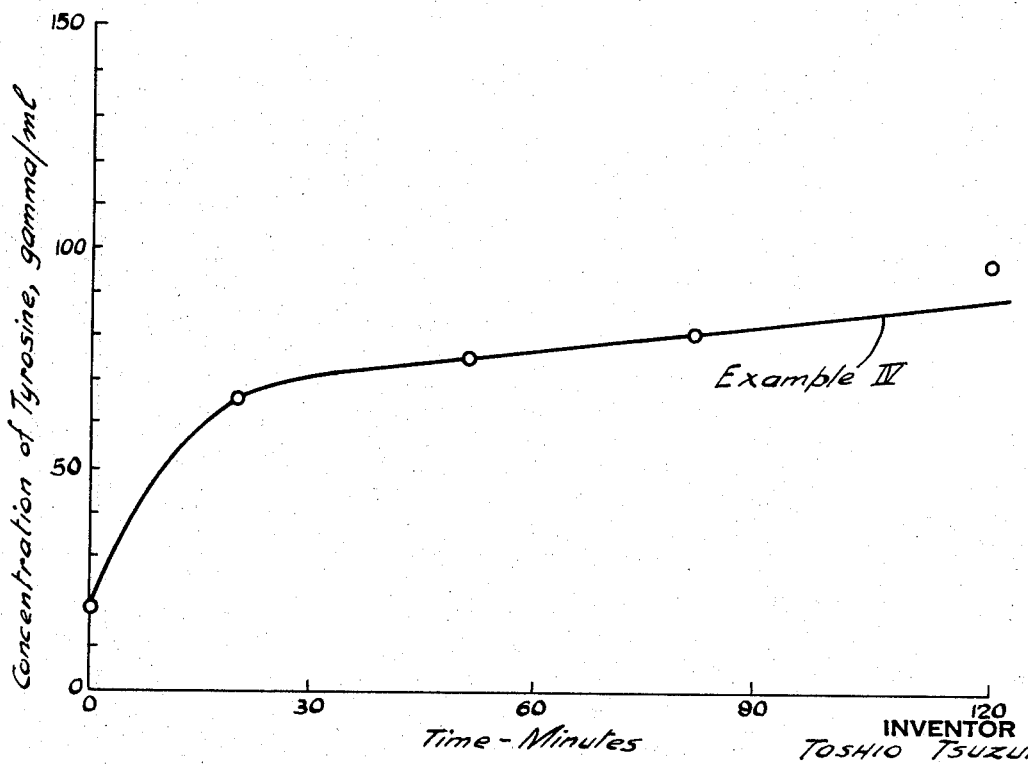
FIG. 2 is a graph that illustrates the increasing amount of tyrosine that is formed as the enzyme reaction with collagen proceeds.

In the following examples, and throughout the specification and claims, all quantities are expressed in parts by weight unless otherwise indicated. The weight of collagen is expressed as the dry (anhydrous) weight. In Examples XII−XVI, the percent figures are based upon the amount of dry collagen solids present in the composition. Therefore, a collagen film cast from a composition containing 30 percent plasticizer would contain 30 grams of plasticizer and 100 grams of dry collagen solids.

EXAMPLE I

The collagen films of the present invention are at least 90 percent soluble when stirred for one minute in water at a temperature of 70°C. or higher. The solubility of a collagen film may be conveniently determined by the following procedure.

A collagen film of about 1 mil thickness is cut to produce two samples approximately 14 square inches in area. The two samples are weighed accurately to one-tenth of a milligram, and one of these samples is dried in an oven at 110°C. overnight. The oven-dried sample is again weighed to determine the loss of moisture.

The second film is added to a beaker equipped with a magnetic stirrer containing approximately 248 ml. of water maintained at 70°C. After stirring for 1 minute, the contents of the beaker are transferred to a 250 ml. graduate, and the volume is read. This volume minus the volume of the magnetic stirrer is the volume of the solution. A 25 ml. aliquot sample is removed from the graduate with a 25 ml. pipette. A small piece of glass wool placed over the opening of the pipette prevents removal from the graduate of any undissolved film fragments. The 25 ml. sample is placed in an evaporating dish and evaporated to dryness in an oven at 110°C. After evaporation of all water, the solubility of the film is calculated from the following equation:

$$\frac{VW}{SP} \times 4 = \text{percent solubility}$$

wherein W is the weight of the residual dried solids in the evaporating dish after evaporation; S is the weight of the collagen film; P is the percent film solids as determined from the loss in weight of the first film sample upon drying at 110°C. overnight; and V is the volume of the solution.

EXAMPLE II

The amount of tyrosine liberated during the collagen-enzyme reaction may be determined at any time during the course of the reaction by the method of Folin and Ciocalteau; Journal of Biological Chemistry, 73, 627 (1927). Standard solutions of tyrosine are prepared by dissolving 100 mg. of crystalline tyrosine in 100 ml. of distilled water and a few drops of 6 normal hydrochloric acid. This stock solution is diluted by adding 10 ml. to a volumetric flask and adding distilled water to a total volume of 100 ml. (1:10). To four sample tubes are added 0.25 ml., 0.5 ml., 1.0 ml., and 1.5 ml. of the dilute stock solution containing 0.1 mg. tyrosine per ml. Distilled water is added to each sample tube to bring the total volume to 5 ml. To each of the four sample tubes is added 2 ml. of 2 normal sodium hydroxide and immediately thereafter 2 ml. of 0.666 normal Folin-Ciocalteau reagent. The contents of each sample tube are mixed by inverting, and the sample tubes are stored for 5 minutes in a dark place. The blue color developed is evaluated at the end of five minutes in a Beckman DU spectrophotometer at a wave length of 660 millimicrons.

From these four values, a standard curve is plotted as shown in FIG. 1, the optical density being indicated on the abscissa and the concentration of tyrosine being indicated on the ordinate.

The concentration of free tyrosine in a collagen-enzyme mixture that contains no acid may now be determined by centrifuging and filtering through a No. 42 Whatmann filter paper a 15 ml. homogeneous sample of the collagen-enzyme mixture. One ml. of this filtered sample is diluted in a sample tube to 5 ml.; 2 ml. of 2 normal sodium hydroxide is added and immediately thereafter 2 ml. of 0.666 Folin-Ciocalteau reagent. The contents of the sample tube are mixed by inverting. After the color has developed for 5 minutes in a dark place, the sample tube is removed and read on a Beckman DU spectrophotometer at 660 millimicrons. If the optical density does not fall within the curve illustrated in FIG. 1, the 1 ml. test sample is appropriately increased or reduced to obtain a value that does fall within this curve. The concentration of tyrosine in the text sample may be determined by reference to FIG. 1.

The amount of tyrosine present in a lyophilized acid-swollen collagen-enzyme mixture or an air dried collagen film may be determined in a similar way by dissolving 100 mg. of the material with stirring in 50 ml. of water. The solution is neutralized to litmus with dropwise addition of $NH_4OH$, quantitatively transferred to a 100 ml. volumetric flask, and made up to 100 ml. with distilled water. The solution is filtered immediately through coarse, sintered glass and then filtered through a fine, sintered glass funnel discarding the first 15 ml. of the filtrate. One to five ml. samples of the filtrate are diluted to 5 ml.; 2 ml. of 2 normal sodium hydroxide is added and immediately thereafter 2 ml. of 0.666 normal Folin-Ciocalteau reagent. The contents of the sample tubes are mixed by inverting and read as described above.

$$\text{The percent tyrosine (dry basis)} = \frac{C \times S}{5} \times 10$$

C = Concentration from curve of Fig. 1

S = Milliliters of the filtrate diluted to 5 ml.

EXAMPLE III

The hydroxyproline content of the collagen-enzyme reaction mixture, which is a measure of the amount of collagen present, may be determined at any time by the method of Woessner, Archives of Biochemistry and Biology 93, 440–447, 1961. In accordance with this method, the collagen present in the reaction mixture is hydrolyzed to its respective amino acids with 6 normal HCl. The freed hydroxyproline is then oxidized by Chloramine T to pyrrole which, in turn, is reacted with p-dimethylaminobenzaldehyde (DMAB) to form a chromogen having a magenta color.

From 2.75 to 3.00 grams of the collagen-enzyme reaction mixture, weighed accurately, is delivered to a 100 ml. volumetric flask. A volume of concentrated HCl equal in ml. to the weight of the sample in grams is added. The flask is then filled not quite to the mark with 6 normal HCl and placed on a steam bath until the sample is dissolved (about 10—15 minutes). The digest is removed and allowed to cool, and it is filled to the mark with 6 normal HCl. The solution is allowed to stand until any fat present floats to the top. A portion of the solution is filtered, rejecting the first 20 ml. and collecting the subsequent filtrate. A 2 ml. aliquot is withdrawn and transferred to the 10 ml. ampoule for processing as described below.

The ampoule containing the 2 ml. aliquot of the 6 normal HCl digest is flushed with nitrogen and sealed. Hydrolysis is completed by placing the ampoule in an oven for 3 hours at 138°C. The ampoule is then cooled to room temperature and the hydrolyzate is quantitatively transferred to a 100 ml. volumetric flask. The sample is then neutralized with 2 ml. of 6 normal NaOH and diluted to volume with water. Exactly 2 ml. of the neutralized and diluted hydrolyzate is transferred to a 16 x 150 mm. test tube.

A stock solution containing 25 mg. of vacuum dried l-hydroxyproline (CalBioChems #3980, Grade A) in 250 ml. of 0.001 normal HCl is prepared. Hydroxyproline standards are prepared fresh by dilution of the stock to obtain concentrations of 1—5 micrograms per two ml. One may dilute 2.5 ml. of the stock standard to 100 ml. with water to give a standard having 2.5 micrograms per ml. In routine practice, two tubes each of 0 and 5 micrograms are usually sufficient to establish an accurate curve.

A 0.05 molar solutuion of Chloramine T (sodium p-toluene sulfonchloramide) is prepared fresh by dissolving 1.41 grams Chloramine T (Matheson, Coleman & Bell, #CK 710) in 20 ml. of water. 30 ml. of methyl cellosolve and 50 ml. water are added. The solution is kept in a glass-stoppered flask. Hydroxyproline oxidation is initiated by adding 1 ml. of this Chloramine T solution to each tube (sample and standards) in a predetermined sequence. The tube's contents are mixed by shaking a few times and allowed to stand 20 minutes at room temperature. The Chloramine T is then destroyed by adding 1 ml. of a 3.15 molar perchloric acid solution to each tube in the same order as before. The contents are mixed and allowed to stand for 5 minutes. Finally, 1 ml. of a 20 percent solution of p-dimethylaminobenzaldehyde is added and the tube shaken until no schlieren can be seen. The 20 percent solution is prepared a few minutes before use by adding methyl cellosolve to 20 grams of p-dimethylaminobenzaldehyde (special grade #6059 for Erlichs reagent by Hartman-Leddon Company, Philadelphia, Pennsylvania) to give a final volume of 100 ml. This may be warmed in a 60°C. water bath until solution is effected.

The tubes are placed in a 60°C. water bath for 25 minutes and cooled in tap water for 5 minutes. The developed color is stable for at least 1 hour. The absorbance values of the colored solutions are determined at 557 mu. to a reagent blank as a reference liquid. The hydroxyproline content of the sample may be determined directly from the standard curve in accordance with the formula:

$$\frac{100 \text{ CFD}}{W} = \text{percent hydroxyproline}$$

wherein,

C = micrograms as determined from standard curve

F = conversion factor micrograms to grams (0.000001)

D = dilution factor = 2,500

W = weight of sample taken in grams.

The amount of hydroxyproline present in an air dried collagen film may also be determined by the method described in this example. Approximately 200 mg. of film are accurately weighed into a 100 ml. volumetric flask. Ninety ml. of 6 normal HCl are added, and the solution is heated on the steam bath until the collagen has been dissolved (about 15 to 20 minutes). The digest is removed from the steam bath and allowed to cool to room temperature. The flask is filled to the mark with 6 normal HCl. A 2 ml. aliquot excluding any fat or precipitate (filter if necessary rejecting the first portion of the filtrate) is transferred to a 10 ml. ampoule for processing as described above.

EXAMPLE IV

The corium of freshly slaughtered beef hides is ground in a meat grinder to pass a one-quarter inch screen. To 13 parts of the ground hide corium (dry hide solids) is added 87 parts water and 0.013 parts ficin. The slurry of collagen in the aqueous enzyme solution is finely ground. After two passes through the grinder, the collagen ficin slurry has a pH of 7.32. At the end of two hours, a homogeneous sample (15 cc) of the collagen slurry is removed and tested for free tyrosine by the procedure described in Example II. The free tyrosine amounted to 0.25 percent (based on dry collagen solids). The collagen is swollen in 18 parts of a solution containing 6 percent (based on dry collagen solids) of citric acid to form a dispersion of swollen collagen fibrils and aged for 24 hours at 23°C. The intrinsic viscosity of the ficin-treated collagen decreased during this 24 hours and approached asymptotically to a value of about 15 deciliters per gram. The viscosities of the dilute collagen solutions in 0.3 percent acetic acid are determined at 25°C.

Collagen films cast from this dispersion are completely soluble in boiling water in 1 minute and have a tensile strength of 10,000 pounds per square inch at 50 percent relative humidity. The amount of free tyrosine in the collagen films, as determined by the procedure described in example II, is 1.07 percent. The hydroxyproline analysis of the film, determined in accordance with example III, is 11.6 percent; a free tyrosine to hydroxyproline ratio of 0.092.

EXAMPLE V

To 13 parts of ground fresh hide corium (dry hide solids) is added 87 parts water. The slurry is finely ground in a Mikrocut grinder. After two passes through the grinder, the slurry is mixed with 18 parts of aqueous solution containing 0.0195 parts ficin and 0.78 parts citric acid. The mixture is incubated at 35°C. for 9 hours. At the end of 9 hours, films are made from the mixture and dried. The films are 90.1 percent soluble in water at 70°C. in one minute. The free tyrosine to hydroxyproline ratio in the films is 0.0875. The tensile strength is 15,000 per square inch at 35 percent relative humidity (15 percent elongation).

EXAMPLE VI

A collagen slurry is prepared from fresh hide corium as described in example IV by adding 2.2 parts of hide solids (ground to pass through a one-quarter inch mesh screen) to 14.7 parts of water. To this slurry is added 0.066 parts of papain and 0.066 parts of the disodium salt of ethylenediaminetetraacetic acid and 0.066 parts of cysteine. The collagen enzyme slurry is passed two times through a grinder and incubated for 4 hours at 35°C. The pH of this material during the incubation period is 7.20.

An aqueous glycerin-starch mixture containing 0.6 parts of acid hydrolyzed amylopectin starch made by the National Starch and Chemical Company of Plainfield, New Jersey, 0.89 parts of glycerin, and 7.99 parts of water is heated to 85°C. over a period of 15 minutes to cook the starch and then cooled to room temperature. This starch-glycerin mixture is acidified with 0.12 parts of citric acid and blended with 15.4 parts of the papain-modified collagen slurry described in the first paragraph of this example. After standing overnight at room temperature, the mixture is homogenized and then stored for 4 hours before a film is made. The acidified collagen-starch-glycerin mixture is cast onto a moving belt and dried with moving air currents at room temperature. A 14-square inch film 1.3 mils in thickness so prepared will dissolve completely in boiling water in less than 30 seconds. The tensile strength is 10,000 pounds per square inch at 50 percent relative humidity (18 percent elongation). The ratio of free tyrosine to hydroxyproline in the film is 0.095.

EXAMPLE VII

An acid solution of starch and glycerin is prepared by mixing 0.75 parts of acid-hydrolized amylopectin starch (manufactured by the National Starch and Chemical Company of Plainfield, New Jersey) and 1.113 parts of glycerin in 1.5 parts of water. This mixture is heated to 85°C. over 15 minutes, cooled to room temperature, and 0.15 parts of citric acid is added thereto.

This acidified glycerin-starch mixture is added with stirring to 19.23 parts of the ficin-modified collagen slurry prepared as described in Example IV above. After storing at room temperature overnight, the mixture is homogenized, de-aerated, and after 4 hours cast onto a moving belt to form a film that is air dried and neutralized with gaseous ammonia.

The film so obtained (14 square inches approximately 1.3 mils in thickness) is 100 percent soluble in boiling water within approximately 30 seconds and has a tensile strength of 16,690 pounds per square inch at 35 percent relative humidity (18.7 percent elongation). The free tyrosine-hydroxyproline ratio in this film is 0.103.

EXAMPLE VIII

Four and seven-tenths parts of ficin are added to 92,000 parts of water. To this solution is added 15,800 parts of one-quarter inch grind fresh hide collagen (23.7 percent solids) to form a slurry that is immediately passed through the grinder. The collagen is then incubated at room temperature for 2 hours. The pH is 7.35.

A glycerin-citric acid solution is prepared by dissolving 1,125 parts glycerin and 375 parts citric acid in 8,500 parts of water.

The enzyme-treated collagen is blended together with the glycerin-citric acid solution, stored overnight at room temperature, homogenized, de-aerated, and after 4 hours cast onto a moving belt. The film is completely soluble in boiling water within 30 seconds and has a tensile strength of 13,050 pounds per square inch at 35 percent relative humidity (elongation 20.6 percent). The free tyrosine-hydroxyproline ratio of this film is 0.093.

EXAMPLE IX

Seven and eight-tenths parts of bromelain are dispersed in 8,700 parts of water. To this solution is added 1,300 parts of the ground fresh hide corium (dry hide solids) form a slurry. After passing through a grinder twice, the slurry is incubated at 30°C. for 150 minutes. The pH is 7.30.

An aqueous solution is prepared by dissolving 78 parts citric acid and 325 parts glycerin in 1,396 parts water. The slurry of enzyme-treated collagen is blended together with the glycerin-citric acid solution and incubated at 30°C. for 20 hours. At the end of 20 hours, the mixture is homogenized and de-aerated. Films are then made from this mixture and dried. The films are 96.8 percent soluble in water at 70°C. in 1 minute. The tensile strength is 13,430 per square inch at 35 percent relative humidity (16.6 percent elongation). The ratio of free tyrosine and hydroxyproline in the films is 0.074.

EXAMPLE X

A freshly-limed hide is washed with a buffered acidic solution to remove the lime. To 1,330 parts of ground unlimed hide corium (dry hide solids) is added 8,670 parts water. The slurry is warmed slowly until its temperature reaches 32°C., when an aqueous dispersion of 0.665 parts of ficin and 3.99 parts of L-cysteine in 200 parts water is mixed thoroughly with the slurry, which is passed through a grinder twice. An aqueous solution is prepared by dissolving 79.2 parts citric acid and 396 parts glycerin in 1,383 parts water. The slurry of enzyme-treated collagen is blended together with the glycerin-citric acid solution and incubated at room temperature overnight. The free tyrosine present amounted to 0.868 percent based on collagen solids. The mixture is homogenized and de-aerated before films are made from the mixture and dried.

The films are 96.6 percent soluble in boiling water in 1 minute. The tensile strength is 14,200 pounds per square inch at 30 percent relative humidity (19.5 percent elongation). The ratio of free tyrosine to hydroxyproline in the films is 0.062.

EXAMPLE XI

The preceding example X is repeated substituting for the 396 parts of glycerin an equal quantity of propylene glycol, and the composition is extruded through a slit onto a moving belt. The physical characteristics of the finished film obtained from this composition is summarized in Table I which gives the properties of a film of 1 mil thickness conditioned at a relative humidity of 50 percent.

TABLE I

| | |
|---|---|
| Tensile strength: | |
| Direction of extrusion | 11,800 p.s.i. |
| Perpendicular to the direction of extrusion | 5,700 p.s.i. |
| Elongation: | |
| Direction of extrusion | 13.2 percent. |
| Perpendicular to the direction of extrusion | 16.7 percent. |
| Impact strength 50% failure | 148 gm./mil. |
| Fold endurance | Excellent. |
| Resistance to grease and oils | Impermeable. |
| Gas permeability: | |
| Nitrogen | 1.4 cc./100 sq. in./24 hrs. |
| Oxygen | 2.6 cc./100 sq. in./24 hrs. |
| $CO_2$ | 6.6 cc./100 sq. in./24 hrs. |
| Solubility | 98.8%, 60 sec., 100° C. |

EXAMPLE XII

Ninety-nine hundred parts of hide corium prepared as described in example X (32.3 percent solids or 3,200 parts of dry hide solids) is ground to form a slurry. Nine and six-tenths parts of ficin and 0.64 parts of cysteine are dispersed in a small amount of water. This dispersion is mixed with the hide slurry, sufficient water being added to bring the total weight up to 17,500 parts. This mixture is passed through a high speed cutting mill wherein the hide particles are shredded with rapidly rotating knives to form a hydrated mass of fibrous character.

A 70 percent sorbitol solution (457 parts) citric acid (192 parts) mannitol (320 parts) and glycerin (320 parts) are dissolved in water to a total weight of 2,500 parts. This solution is blended with the collagen slurry and passed through a meat grinder having one-eighth inch openings in the plates. The mixture so obtained contained 16 percent by weight hide solids and had the following composition based on the hide solids present:

| | percent |
|---|---|
| Ficin | 0.30 |
| Cysteine | 0.02 |
| Citric acid | 6 |
| Mannitol | 10 |
| Sorbitol | 10 |
| Glycerin | 10 |

The mixture is incubated at 30°C. for 24 hours and is homogenized and de-aerated.

The homogenized composition is cast onto a belt to form a film having a wet thickness of 7½ mils. The film is dried in circulating air at a temperature of 150°F. to a moisture content of approximately 10 percent; the ultimate thickness of this film being about 1 mil.

The film so obtained has excellent heat sealing characteristics and will provide a strong bond when sealed with a Model No. 12 AS Sentinel Heat Sealer manufactured by Packaging Industries, Ltd., Inc., of Hyannis, Massachusetts. The sealing time is 0.2 second; jaw pressure, 60 lbs.; and temperature 230°F.

EXAMPLE XIII

The preceding example XII is repeated substituting for the mannitol, sorbitol, and glycerin plasticizers 1120 parts of mannitol (35 percent based on collagen solids). The resulting mixture has the following composition:

| | percent |
|---|---|
| Ficin | 0.30 |
| Cysteine | 0.02 |
| Citric acid | 6 |
| Mannitol | 35 |

A 1 mil film cast from this composition has a tensile strength of 21,220 p.s.i. and an elongation of 19.3 percent in the machine direction, measured on an Instron machine at 60 percent relative humidity. The film is completely soluble in water at 100°C. within 60 seconds and may be heat sealed within the temperature range of 220°F. to 247°F.

EXAMPLE XIV

The preceding example XII is repeated substituting mannitol for the glycerin and some of the sorbitol plasticizer. The extrusion mixture has the following composition as based on the hide solids present:

| | precent |
|---|---|
| Ficin | 0.30 |
| Cysteine | 0.02 |
| Citric acid | 6 |
| Mannitol | 24 |
| Sorbitol | 6 |

The mixture is incubated at 30°C. for 24 hours, homogenized and de-aerated.

A 1 mil film cast from this composition is slightly opaque, having a tensile strength of 27,060 p.s.i. at 31.5 percent relative humidity (22.8 percent elongation). The film will produce a strong heat seal within the temperature range of 220°F. to 240°F. The film is completely dispersed in boiling water in 4 seconds.

EXAMPLE XV

The extrusion mass is prepared by general procedure described in example XII. The mixture contains 14.5 percent hide solids and has the following composition based on the hide solids present:

|  | percent |
|---|---|
| Ficin | 0.30 |
| Cysteine | 0.02 |
| Citric acid | 6 |
| Mannitol | 20 |
| Sorbitol | 10 |
| Propylene glycol | 10 |

A 1.2 mil film cast from this composition has a tensile strength of 18,220 p.s.i. at 32 percent relative humidity (18.4 percent elongation). The film is completely dispersed in boiling water in 10 seconds.

EXAMPLE XVI

The preceding example XII is repeated substituting for the mannitol and glycerin plasticizer, additional sorbitol. The resulting mixture has the following composition based on the hide solids present:

|  | percent |
|---|---|
| Ficin | 0.30 |
| Cysteine | 0.02 |
| Citric acid | 6 |
| Sorbitol | 30 |

Tensile strength of this film of about 1 mil thickness is 22,340 p.s.i. at 21 percent relative humidity (26 percent elongation). The film is 100 percent soluble in boiling water in 1 minute.

I claim:

1. An edible collagen that is at least 90 percent soluble in water at 70°C. and useful in the manufacture of heat sealable, edible films; said collagen being characterized by a tensile strength of at least 10,000 p.s.i. and a free tyrosine to hydroxyproline ratio of at least 0.062.

2. An edible, heat sealable collagen film having a tensile strength of at least 10,000 p.s.i. and being at least 90 percent soluble in water at 70°C., said film comprising collagen characterized by a free tyrosine to hydroxyproline ratio of at least 0.062 and a plasticizer.

3. The edible film of claim 2, wherein the plasticizer is glycerin.

4. The edible film of claim 2, wherein the amount of plasticizer present is from about 20 percent to about 50 percent by weight of the collagen solids present in said film.

5. The edible film of claim 2, wherein the plasticizer is propylene glycol.

6. The edible film of claim 2, wherein the plasticizer is mannitol.

7. The edible film of claim 2, wherein the plasticizer is sorbitol.

8. The edible film of claim 2, wherein the plasticizer is a mixture of glycerin, mannitol, and sorbitol.

9. The edible film of claim 8, wherein the total amount of plasticizer is about 30 percent by weight of the collagen solids present in said film.

10. A method of preparing a heat sealable, edible film having a tensile strength of at least 10,000 p.s.i. and being at least 90 percent soluble in water within 1 minute at 70°C, which comprises: contacting collagen, which is in finely comminuted form and which has been derived from fresh or unlimed hide corium, with a proteolytic enzyme in an acid medium; allowing the resultant mixture to be stored until the collagen therein has a free tyrosine to hydroxyproline ratio of at least 0.062; and thereafter forming a film from said mixture, which film has a free tyrosine to hydroxyproline ratio of at least .062.

11. The method of claim 10, wherein the proteolytic enzyme is ficin.

12. The method of claim 10, wherein the proteolytic enzyme is bromelain.

13. The method of claim 10, wherein the proteolytic enzyme is papain.